(12) United States Patent
Van Den Enden et al.

(10) Patent No.: US 6,728,923 B1
(45) Date of Patent: Apr. 27, 2004

(54) ERROR CORRECTION ENCODING A DATA STREAM OF INFORMATION

(75) Inventors: Gijsbert Joseph Van Den Enden, Veldhoven (NL); Aalbert Stek, Eindhoven (NL); Martinus Wilhelmus Blum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 510 days.

(21) Appl. No.: 09/590,252

(22) Filed: Jun. 8, 2000

(30) Foreign Application Priority Data

Jun. 10, 1999 (EP) .............................. 99201840

(51) Int. Cl.⁷ ..................... H03M 13/00; H03M 13/03; G06F 11/00
(52) U.S. Cl. ..................... 714/775; 714/789; 714/798
(58) Field of Search ................. 714/775, 789, 714/798

(56) References Cited

U.S. PATENT DOCUMENTS

| | | | | |
|---|---|---|---|---|
| 3,873,920 A | * | 3/1975 | Apple et al. | ........... 714/775 |
| 4,525,840 A | * | 7/1985 | Heinz et al. | ............ 386/49 |
| 5,349,588 A | * | 9/1994 | Schellinger | ........... 714/778 |
| 5,793,724 A | * | 8/1998 | Ichikawa et al. | ....... 369/47.31 |
| 5,854,876 A | * | 12/1998 | Kim | ............ 386/124 |
| 6,175,686 B1 | * | 1/2001 | Noda | ............ 386/123 |
| 6,226,247 B1 | * | 5/2001 | Sako et al. | ........... 369/53.31 |

FOREIGN PATENT DOCUMENTS

| | | | | |
|---|---|---|---|---|
| EP | 820063 A2 | * | 1/1998 | ........ G11B/20/12 |
| EP | 0902426 A1 | | 3/1999 | ........ G11B/20/00 |
| WO | WO9631880 | | 10/1996 | ........ G11B/20/14 |

* cited by examiner

Primary Examiner—Albert Decady
Assistant Examiner—Joseph D. Torres

(57) ABSTRACT

An apparatus and method for error correction encoding a datastream of information into blocks of error correction encoded information. An input terminal receives the datastream. An error correction encoding unit performs an error correction encoding on portions of the datastream. A block of error correction encoded information includes n sync blocks, each sync block including a sync word and a portion of the error correction encoded information, where n exceeds 3. An output terminal supplies the blocks of error correction encoded information. The error correction encoding unit supplies one of m mutually different sync words to each n sync block, such that the sequence of two sync words of corresponding two sync blocks of the n sync blocks is unique with respect to the bit patterns within the two sync words, m satisfying 2<m<n.

26 Claims, 2 Drawing Sheets

ERROR CORRECTION ENCODING A DATA STREAM OF INFORMATION

BACKGROUND OF THE INVENTION

1. Technical Field

The invention relates to an apparatus for error correction encoding a data stream of information into blocks of error correction encoded information.

2. Related Art

Such an apparatus is known from WO 96/31880. The known apparatus discloses the generation of different sync words for the sync blocks in a block of error correction encoded information. This enables the identification of the position of a sync block within a block of error correction encoded information. In spite of this, errors occur after receiving the error correction encoded information that cannot be corrected for in the error correction step normally available in the receiver.

SUMMARY OF THE INVENTION

The invention aims at improving the error correction capability. In accordance with the invention, the error correction encoder supplies one of m mutually different sync words to each of said n sync blocks in said block of error correction encoded information, such that the sequence of two sync words of two subsequent sync blocks in the block of error correction encoded information is unique for each two subsequent sync blocks in the block of error correction encoded information, m being an integer for which holds $2<m<n$.

The invention is based on the following recognition. Sync words used for identifying the sync blocks are generally unique bit patterns that do not occur elsewhere in the serial data stream of information. A further aim is to uniquely identify the exact position of a sync block in the array of n sync blocks in the blocks of error correction encoded information. This requires a plurality of mutually different sync words. It should further be noted that the error correction capability increases with increasing number of sync blocks in a block of error correction encoded information. Identifying each sync block separately would mean that there are as many sync words as there are sync blocks in a block of error correction encoded information. In accordance with the invention, with the requirement that the sequence of two sync words of two subsequent sync blocks in the block of error correction encoded information is unique for each two subsequent sync blocks in the block of error correction encoded information, less mutually different sync words are needed, so that more words are available for the information itself, whilst moreover improving the error correction capability.

In the invention, the error correction encoder may supply one of m mutually different sync words to each of said n sync blocks in said block of error correction encoded information, such that each time two sync words of two sync blocks in the block of error correction encoded information separated from each other by one sync block is unique for each group of two sync blocks in the block of error correction encoded information, said two sync blocks being separated from each other by one sync block, m being an integer for which holds $2<m<n$. This enables a reliable determination of the position of the sync block detected, even in the case that the sync word of this sync block was missed.

In the invention, the error correction encoder may supply one of m mutually different sync words to each of said n sync blocks in said block of error correction encoded information, such that each time two sync words of two sync blocks in the block of error correction encoded information separated from each other by two sync blocks is unique for each group of two sync blocks in the block of error correction encoded information, said two sync blocks being separated from each other by two sync blocks, m being an integer for which holds $3<m<n$. This enables a reliable determination of the position of the sync block detected, even in the case that the sync word of this sync block and the sync word of the preceding or the next sync block was missed.

BRIEF DESCRIPTION OF THE DRAWINGS

These and other aspects of the invention will be apparent from and further elucidated with respect to embodiments described in the following figure description, in which.

DETAILED DESCRIPTION OF THE INVENTION

Figure 1:
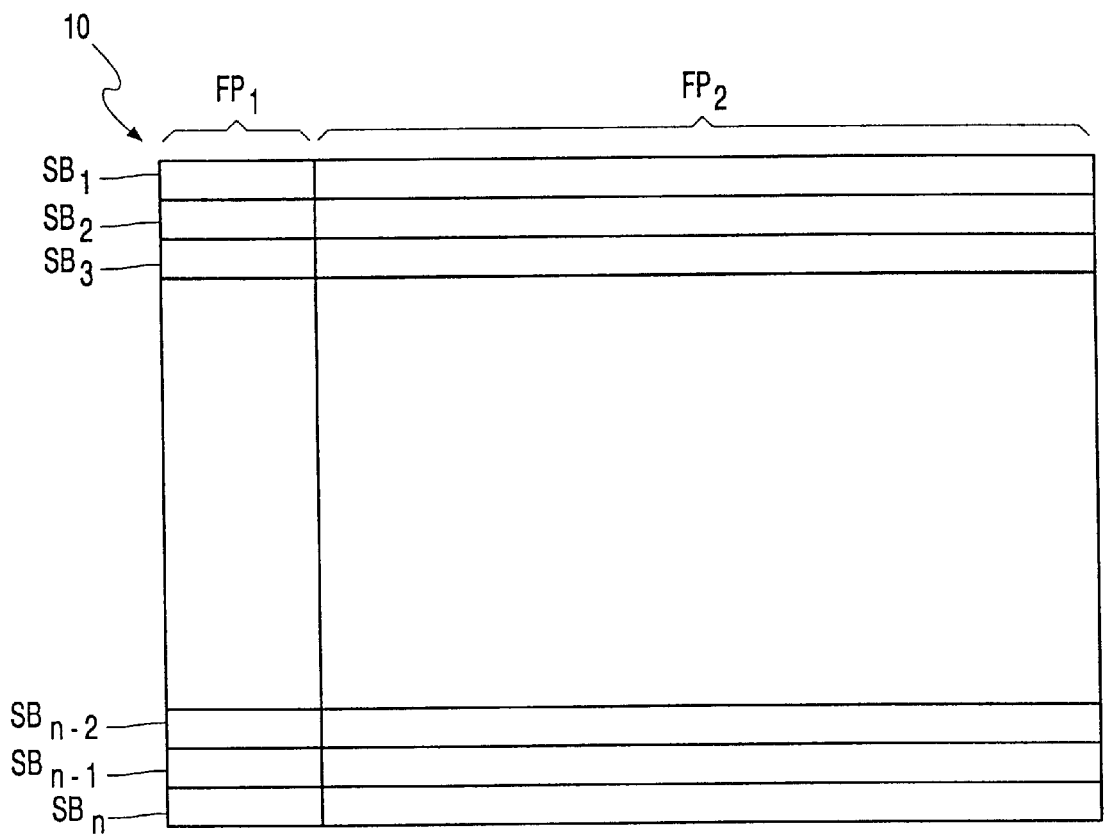
FIG. 1 shows a block of error correction encoded information, including sync blocks of information.

FIG. 1 shows a block 10 of error correction encoded information obtained from carrying out an error correction encoding step, generally known in the art, on a portion of the incoming data stream of information. The block 10 comprises n sync blocks, denoted $SB_1, SB_2, \ldots, SB_{n-1}, SB_n$. Each sync block comprises a sync word, included in the first part FP1 in each of the sync blocks and the remaining part FP2 of the sync blocks is used for storing portions of the error correction encoded information. A limited number of m mutually different sync words are used for incorporation into the first parts FP1 of each of the sync blocks.

In an embodiment of the block of error correction encoded information, it is assumed that n=31 and that 7 mutually different sync words are used for incorporation in the first parts FP1 of the 31 sync blocks.

In the table given below, the sync words for the 31 sync blocks of the block of error correction encoded information are given for four different embodiments. In all embodiments, 7 mutually different sync words are available, sw0 to sw6. As can be seen, in each embodiment, the sync word sw0 is used for the first sync block of the block of error correction encoded information. The other sync words are used to identify the sync blocks numbered 2 to 31 in the block of error correction encoded information.

TABLE 1 various sequences of sync words

| Sync block sequence no. | Sync word 1st embodiment | Sync word 2nd embodiment | Sync word 3rd embodiment | Sync word 4th embodiment |
|---|---|---|---|---|
| 1 | sw0 | sw0 | sw0 | sw0 |
| 2 | sw1 | sw1 | sw1 | sw1 |
| 3 | sw1 | sw2 | sw2 | sw2 |
| 4 | sw2 | sw2 | sw3 | sw3 |
| 5 | sw3 | sw3 | sw2 | sw3 |
| 6 | sw2 | sw1 | sw4 | sw1 |
| 7 | sw4 | sw3 | sw4 | sw4 |
| 8 | sw5 | sw4 | sw2 | sw1 |
| 9 | sw5 | sw4 | sw5 | sw5 |

TABLE 1-continued various sequences of sync words

| Sync block sequence no. | Sync word 1st embodiment | Sync word 2nd embodiment | Sync word 3rd embodiment | Sync word 4th embodiment |
|---|---|---|---|---|
| 10 | sw4 | sw5 | sw3 | sw5 |
| 11 | sw3 | sw3 | sw5 | sw4 |
| 12 | sw4 | sw5 | sw6 | sw3 |
| 13 | sw6 | sw1 | sw6 | sw4 |
| 14 | sw2 | sw1 | sw5 | sw6 |
| 15 | sw2 | sw6 | sw4 | sw6 |
| 16 | sw6 | sw5 | sw3 | sw3 |
| 17 | sw3 | sw6 | sw4 | sw5 |
| 18 | sw6 | sw3 | sw1 | sw3 |
| 19 | sw1 | sw3 | sw1 | sw2 |
| 20 | sw4 | sw2 | sw4 | sw2 |
| 21 | sw4 | sw6 | sw6 | sw5 |
| 22 | sw1 | sw2 | sw3 | sw6 |
| 23 | sw3 | sw5 | sw6 | sw5 |
| 24 | sw1 | sw5 | sw2 | sw1 |
| 25 | sw5 | sw4 | sw2 | sw1 |
| 26 | sw6 | sw2 | sw6 | sw6 |
| 27 | sw6 | sw4 | sw1 | sw2 |
| 28 | sw5 | sw6 | sw3 | sw6 |
| 29 | sw3 | sw6 | sw1 | sw4 |
| 30 | sw5 | sw1 | sw5 | sw4 |
| 31 | sw2 | sw4 | sw5 | sw2 |

It is submitted that the apparatus of the invention generates the blocks of error correction encoded information in accordance with the array of sync words in one of the columns given below.

From the examples given above, it is clear that the array of sync words satisfy the following rules:

1. A sequence of two sync words of two subsequent sync blocks in the block of error correction encoded information is unique for each two subsequent sync blocks in the block of error correction encoded information. An example: in the first embodiment, the sync words of the sync blocks $SB_{27}$ and $SB_{28}$ are sw6 and sw5. This sequence of two sync words occurs only once in the sequence of 31 sync words. Further, preferably, also the sequence of the last sync word in a block of error correction encoded information and the first sync word in the next block of error correction encoded information is unique.

2. Each time two sync words of two sync blocks in the block of error correction encoded information being separated from each other by one sync block is unique for each group of two sync blocks in the block of error correction encoded information separated from each other by one sync block. An example: in the second embodiment, the sync words of the sync blocks $SB_{13}$ and $SB_{15}$ are sw1 and sw6. This sequence of two sync words occurs only once for sync words of sync blocks being separated from each other by one sync block in the block of error correction encoded information. This requirement is preferably also valid across the boundary between two subsequent blocks of error correction encoded information.

3. Each time two sync words of two sync blocks in the block of error correction encoded information separated from each other by two sync blocks is unique for each group of two sync blocks in the block of error correction encoded information separated from each other by two sync blocks. An example: in the third embodiment, the sync words of the sync blocks $SB_2$ and $SB_5$ are sw1 and sw2. This sequence of two sync words occurs only once for sync words of sync blocks separated from each other by two sync blocks in the block of error correction encoded information. This requirement is preferably also valid across the boundary between two subsequent blocks of error correction encoded information.

4. Each time two sync words of two sync blocks in the block of error correction encoded information being separated from each other by three sync blocks is unique for each group of two sync blocks in the block of error correction encoded information separated from each other by three sync blocks. An example: in the fourth embodiment, the sync words of the sync blocks $SB_{20}$ and $SB_{24}$ are sw2 and sw1. This sequence of two sync words occurs only once for sync words of sync blocks separated from each other by three sync blocks in the block of error correction encoded information. This requirement is preferably also valid across the boundary between two subsequent blocks of error correction encoded information.

During reception of a data stream comprising an array of blocks of error correction encoded information, subsequent sync blocks of information are received. Three subsequent sync blocks, defined as $SB_{i-2}$, $SB_{i-1}$, $SB_i$, $SB_{i+1}$ and $SB_{i+2}$, have sync words defined as $SW_a$, $SW_b$, $SW_c$, $SW_d$ and $SW_e$, respectively.

Suppose that, upon reception, the sync word of the sync block $SB_i$ is distorted and cannot be identified. Assuming that the sync words $sw_b$ and $sw_d$ equal both sw2, and further assuming that the sync words satisfy the array of sync words in accordance with the first embodiment, it can be established that the distorted sync word was sw3, and that the sync block of this distorted sync word was the sync block SB5. It is now possible to store the data included in this sync block in the correct position in an error correction memory included in a receiver, so that an error correction step can be carried out on the data stored in the memory.

Suppose that, upon reception, the sync words of the sync blocks $SB_i$ and $SB_{i+1}$ are distorted and cannot be identified. Assuming that the sync words $sw_b$ and $sw_e$ equal sw3 and sw1, and further assuming that the sync words satisfy the array of sync words in accordance with the second embodiment, it can be established that the distorted sync words were sw5 and sw1 and that the sync blocks of the distorted sync words were the sync blocks SB12 and SB13, respectively. It is now possible to store the data included in these sync blocks in the correct position in an error correction memory included in a receiver, so that an error correction step can be carried out on the data stored in the memory.

Suppose that, upon reception, the sync words of the sync blocks $SB_{i-1}$, $SB_i$ and $SB_{i+1}$ are distorted and cannot be identified. Assuming that the sync words $sw_a$ and $sw_e$ equal sw1 and sw5, and further assuming that the sync words satisfy the array of sync words in accordance with the third embodiment, it can be established that the distorted sync words were sw3, sw1 and sw5 and that the sync blocks of the distorted sync words were the sync blocks SB28, SB29 and SB30, respectively. It is now possible to store the data included in these sync blocks in the correct position in an error correction memory included in a receiver, so that an error correction step can be carried out on the data stored in the memory.

It will be clear that, where necessary, this can be extended in order to correct for more than three distorted sync words.

Figure 2:
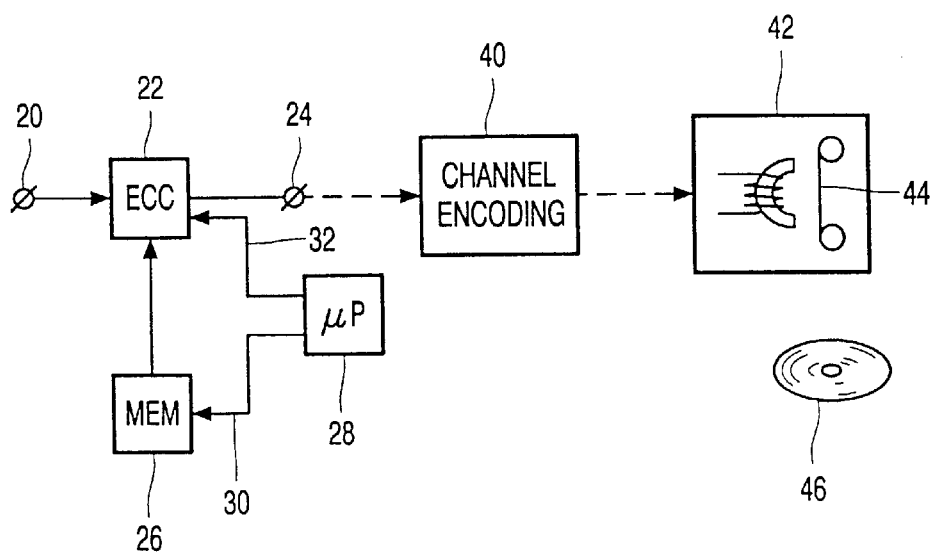
FIG. 2 shows an embodiment of the error correction encoding apparatus.

FIG. 2 shows schematically an embodiment of the apparatus in accordance with the invention. The apparatus for error correction encoding a data stream of information into blocks of error correction encoded information, comprises an input terminal 20 for receiving the data stream of information. The input terminal 20 is coupled to an input of a signal processing unit 22. The unit 22 is capable of carrying out an error correction encoding step, well known in the art, on the incoming data stream. Further, the unit 22 may be capable of carrying out a channel encoding step, well known in the art, either prior to, but generally after, the error correction encoding step, on the incoming data stream. An error correction encoded data stream of information is supplied to an output terminal 24. Further, a generator unit 26 is available for supplying the plurality of m mutually different sync words. The unit 26 could be in the form of a memory in which the m mutually different sync words are stored. Generation of a sync word can be realized by addressing a memory location in the memory by means of an address signal generated by a microprocessor unit 28 and supplied via the line 30. The unit 28 further supplies a control signal via the line 32 to the processing unit 22 to control the functioning of the unit 22.

The error correction encoding unit 22 generates blocks of error correction encoded information in response to said error correction encoding step carried out a portions of said data stream of information. As an example, a block of v times w data words of the serial data stream of information is subjected to an error correction encoding step, resulting in the generation of 'horizontal' parity words and 'vertical' parity words. The parity words are arranged such that blocks of error correction encoded data are created comprising n times m data words. The n arrays of m data words each fit in the right hand portion of FIG. 1, indicated by FP2 for each of the n sync blocks. Each sync block further comprises a sync word n is a positive integer larger than 3.

The error correction encoding unit 22 is further adapted to supply one of the m mutually different sync words to each of said n sync blocks in said block of error correction encoded information, such that the sequence of two sync words of two subsequent sync blocks in the block of error correction encoded information is unique for each two subsequent sync blocks in the block of error correction encoded information, m being an integer for which holds 2<m<n.

In another embodiment, the error correction encoding unit 22 is further adapted to supply one of the m mutually different sync words to each of said n sync blocks in said block of error correction encoded information, such that each time two sync words of two sync blocks in the block of error correction encoded information being separated one sync block apart from each other is unique for each group of two sync blocks in the block of error correction encoded information being separated one sync block apart, m being an integer for which holds 2<m<n.

In again another embodiment, the error correction encoding unit 22 is further adapted to supply one of m mutually different sync words to each of said n sync blocks in said block of error correction encoded information, such that each time two sync words of two sync blocks in the block of error correction encoded information separated two sync blocks apart from each other is unique for each group of two sync blocks in the block of error correction encoded information separated two sync blocks apart from each other, m being an integer for which holds 3<m<n. n should be larger than 4 in this case.

All above requirements could also be valid across the boundary between two subsequent blocks of error correction encoded information.

It should further be noted that the apparatus may be provided with a channel encoding unit 40 for carrying out a channel encoding step on the information prior to eg. recording the error correction encoded data on a record carrier 44, such as a magnetic record carrier, or an optical record carrier 46. The channel encoding step is well known in the art. The step of adding the sync words may be carried out in the channel encoding unit 40, instead of in the error correction encoding unit 22. It should be noted here that the various requirements described above for the application of the mutually different sync words to the various sync blocks could be combined into one and the same embodiment of the apparatus in accordance with the invention.

Figure 3:
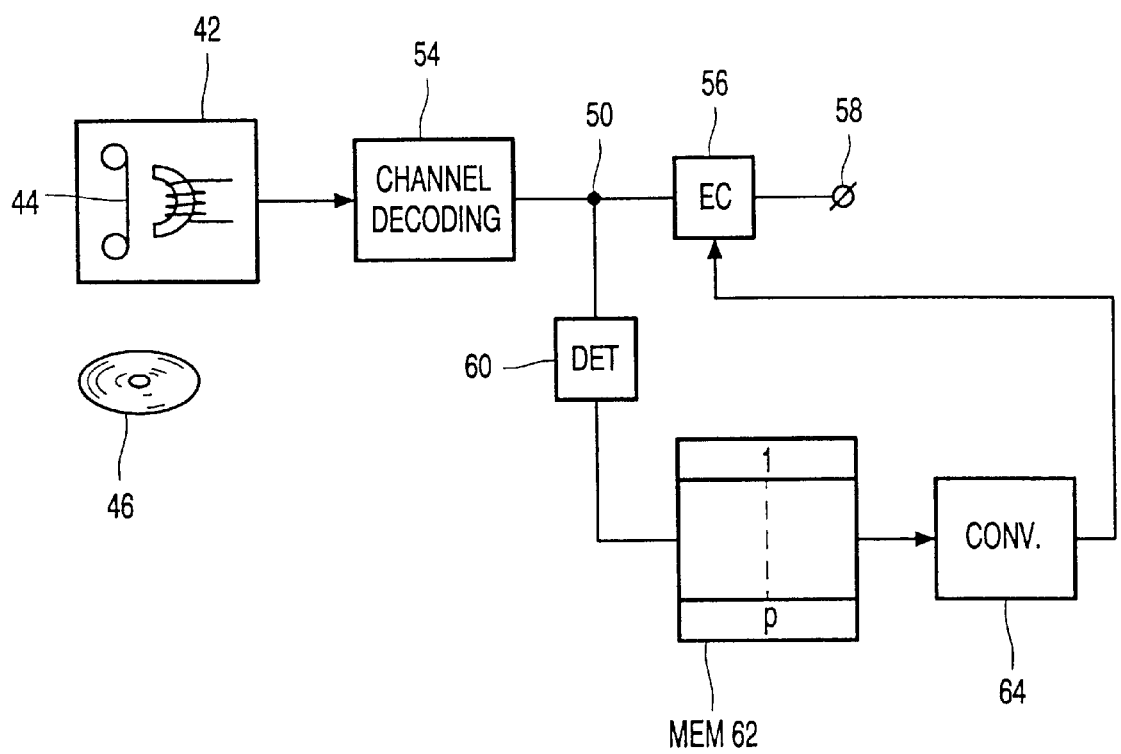
FIG. 3 shows an embodiment of an error correction apparatus.

FIG. 3 shows an error correction apparatus, provided with an input terminal 50 for receiving the blocks of error correction encoded information. Those blocks of error correction encoded information may have been obtained from reading information from a record carrier, such as the magnetic record carrier 44 or the optical record carrier 46, by means of a reading unit 42 and after having carried out a channel decoding step on the information read from the record carrier in a channel decoding unit 54.

An error correction unit 56 is available for carrying out an error correction step on blocks of error correction encoded information included in the signal supplied via the terminal 50, so as to obtain blocks of error corrected information. The blocks of error corrected information are supplied to an output terminal 58 as a serial data stream of information. The apparatus is provided with a detection unit 60 for detecting m mutually different sync words, where m is an integer smaller than n. More specifically, the detection unit 60 is adapted to detect two sync words in the blocks of error correction encoded information, said two sync words being the sync words of the $i^{th}$ and $j^{th}$ sync block in a block of error correction encoded information. The sync words detected are stored in a memory 62. This memory has at least three memory locations for storing the sync words detected for three subsequent sync blocks in a block of error correction encoded information. When having detected two subsequent sync words of two subsequent sync blocks i and j in a block of information, the apparatus is capable of identifying the position of the said $i^{th}$ and $j^{th}$ sync block in said block of error correction encoded information. This is realized by means of a converter unit 64, which is capable of converting the sequence of two directly successive sync words into a position information, indicating the position of the two sync blocks in the block of error correction encoded information.

The memory 62 has p memory locations for storing the sync words of p subsequent sync blocks, where p equals 3 or larger. In the case of p=3, the sync word in the second memory location may be erroneous, or could not be detected at all. Again the position of this central sync block of the three successive sync blocks corresponding to the three sync words in the memory 62 can be established in the converter unit 64, using the sync words in the first and third memory location of the memory 62.

In the case of p=4, the sync words in the second and/or third memory location of the memory 62 may be erroneous, or could not be detected at all. Again the position of this second and/or third sync block of the four successive sync blocks corresponding to the four sync words in the memory 62 can be established in the converter unit 64, using the sync words in the first and fourth memory location of the memory 62.

In the case of p=5, the sync words in the second and/or third and/or fourth memory location of the memory 62 may be erroneous, or could not be detected at all. Again the position of this second and/or third and/or fourth sync block of the five successive sync blocks corresponding to the five sync words in the memory 62 can be established in the converter unit 64, using the sync words in the first and fifth memory location of the memory 62.

Next, a different approach for determining the row number within a block from the sync numbers will be given. Use will be made of the sequence of sync words as listed in embodiment 4 in the previous table 1.

Suppose two sync numbers $S_R$ and $S_{R-d}$ have been detected, where R is the unknown row number and d is the (known) distance between the syncs.

It appears to be convenient to remap the sync numbers (see columns 4 and 5 of table 2) and to divide the total block of 31 sync blocks into 6 sub blocks of 5 rows and row 0. Now the sync numbers show a regular structure (as shown in column 6 of table 2). Sync S0 disturbs the regular structure, which has to be accounted for (dark gray areas in columns 8 to 10 in table 2). Note that all additions in table 2 are done modulo 6.

Next, follows the procedure to determine the row number in the total block from two sync numbers and their distance:

1. Check for special cases: $S_R=0$ (before remapping) $S_R=2$ and $S_{R-4}=5$ (after remapping, only when d=4)
2. Calculate the difference $\Delta = S_R - S_{R-d}$ (modulo 6)
3. Determine the relative row number r with the appropriate lookup table (see table 3)
4. Calculate $n_b$. This is also the sub block number b
5. Calculate the absolute row number: R=5*b+r+1

With a brute force lookup table one would need 8 input bits (2×3 bits for the sync numbers and 2 bits for the distance) and 5 output bits. When this table is implemented in a ROM 1280 bits are required.

With the method described above 5 lookup tables (4 shown in table 3 and one to do the remapping of the sync numbers) with 3 input bits and 3 output bits are necessary. This requires 135 ROM bits plus some additional logic.

TABLE 2

Overview

| sub block number | Absolute row number | relative row number | Sync number | Re-mapped Sync | Difference $\Delta = S_R - S_{R-d}$ Distance (d) | | | |
|---|---|---|---|---|---|---|---|---|
| b | R | r | $S_R$ | number $n_b$ | 1 | 2 | 3 | 4 |
| 0 | 0 | | 0 | 5 | | | | |
| | 1 | 0 | 1 | 0 | $n_0 = 0$ | 1 | 1 | 5 | 5 |
| | 2 | 1 | 2 | 5 | $n_0+5$ | 5 | 0 | 0 | 4 |
| | 3 | 2 | 3 | 2 | $n_0+2$ | 3 | 2 | 3 | 3 |
| | 4 | 3 | 3 | 2 | $n_0+2$ | 0 | 3 | 2 | 3 |
| | 5 | 4 | 1 | 0 | $n_0$ | 4 | 4 | 1 | 0 |
| 1 | 6 | 0 | 4 | 1 | $n_1 = 1$ | 1 | 5 | 5 | 2 |
| | 7 | 1 | 1 | 0 | $n_1+5$ | 5 | 0 | 4 | 4 |
| | 8 | 2 | 5 | 3 | $n_1+2$ | 3 | 2 | 3 | 1 |
| | 9 | 3 | 5 | 3 | $n_1+2$ | 0 | 3 | 2 | 3 |
| | 10 | 4 | 4 | 1 | $n_1$ | 4 | 4 | 1 | 0 |
| 2 | 11 | 0 | 3 | 2 | $n_2 = 2$ | 1 | 5 | 5 | 2 |
| | 12 | 1 | 4 | 1 | $n_2+5$ | 5 | 0 | 4 | 4 |
| | 13 | 2 | 6 | 4 | $n_2+2$ | 3 | 2 | 3 | 1 |
| | 14 | 3 | 6 | 4 | $n_2+2$ | 0 | 3 | 2 | 3 |
| | 15 | 4 | 3 | 2 | $n_2$ | 4 | 4 | 1 | 0 |
| 3 | 16 | 0 | 5 | 3 | $n_3 = 3$ | 1 | 5 | 5 | 2 |
| | 17 | 1 | 3 | 2 | $n_3+5$ | 5 | 0 | 4 | 4 |
| | 18 | 2 | 2 | 5 | $n_3+2$ | 3 | 2 | 3 | 1 |
| | 19 | 3 | 2 | 5 | $n_3+2$ | 0 | 3 | 2 | 3 |
| | 20 | 4 | 5 | 3 | $n_3$ | 4 | 4 | 1 | 0 |
| 4 | 21 | 0 | 6 | 4 | $n_4 = 4$ | 1 | 5 | 5 | 2 |
| | 22 | 1 | 5 | 3 | $n_4+5$ | 5 | 0 | 4 | 4 |
| | 23 | 2 | 1 | 0 | $n_4+2$ | 3 | 2 | 3 | 1 |

TABLE 2-continued

Overview

| sub block number | Absolute row number | relative row number | Sync number | Re-mapped Sync | Difference $\Delta = S_R - S_{R-d}$ Distance (d) | | | |
|---|---|---|---|---|---|---|---|---|
| b | R | r | $S_R$ | number $n_b$ | 1 | 2 | 3 | 4 |
| | 24 | 3 | 1 | 0 | $n_4+2$ | 0 | 3 | 2 | 3 |
| | 25 | 4 | 6 | 4 | $n_4$ | 4 | 4 | 1 | 0 |
| 5 | 26 | 0 | 2 | 5 | $n_5 = 5$ | 1 | 5 | 5 | 2 |
| | 27 | 1 | 6 | 4 | $n_5+5$ | 5 | 0 | 4 | 4 |
| | 28 | 2 | 4 | 1 | $n_5+2$ | 3 | 2 | 3 | 1 |
| | 29 | 3 | 4 | 1 | $n_5+2$ | 0 | 3 | 2 | 3 |
| | 30 | 4 | 2 | 5 | $n_5$ | 4 | 4 | 1 | 0 |

TABLE 3

Lookup tables that map the difference $\Delta$ to the relative row number r

| d = 1 | | d = 2 | | d = 3 | | d = 4 | |
|---|---|---|---|---|---|---|---|
| r | $\Delta$ | r | $\Delta$ | r | $\Delta$ | r | $\Delta$ |
| 0 | 1 | 0 | 5, 1 | 0 | 5 | 0 | 2, 5 |
| 1 | 5 | 1 | 0 | 1 | 4, 0 | 1 | 4 |
| 2 | 3 | 2 | 2 | 2 | 3 | 2 | 1 |
| 3 | 0 | 3 | 3 | 3 | 2 | 3 | 3 |
| 4 | 4 | 4 | 4 | 4 | 1 | 4 | 1 |
| (a) | | (b) | | (c) | | (d) | |

Whilst the invention has been described with reference to preferred embodiments thereof, it is to be understood that these are not limitative examples. Thus, various modifications may become apparent to those skilled in the art, without departing from the scope of the invention, as defined by the claims. Further, any reference signs do not limit the scope of the claims. The invention, as far as incorporated in the error correction encoding apparatus, can be implemented by means of both hardware and software, and several "means" may be represented by the same item of hardware. The word 'comprising' does not exclude the presence of other elements or steps than those listed in a claim. Also, the word "a" or "an" preceding an element does not exclude the presence of plurality of such elements. In addition, the invention lies in each and every novel feature or combination of features.

What is claimed is:

1. Apparatus comprising:

an input for receiving a data stream of information;

error correction encoding means for error correction encoding portions of the data stream of information so as to obtain blocks of error correction encoded information, a block of error correction encoded information containing n ordered sync blocks, each sync block containing a sync word and a portion of the error correction encoded information, where n is a positive integer larger than 3, the error correction encoding means supplying said sync word to each sync block such that each of said sync words is one of m mutually different sync words, such that each sequence of two sync words of corresponding two sync blocks of the n sync blocks is unique with respect to the bit patterns therewithin, said corresponding two sync blocks being consecutive sync blocks, m being an integer for which 2<m<n; and an output for supplying the blocks of error correction encoded information.

2. The apparatus of claim 1, in which:

the error correction encoding means supply a specific one of the m sync words only to the first sync block of the n sync blocks in each of the blocks of error correction encoded information;

the error correction encoding means channel encode either the data stream of information or the blocks of error correction encoded information; and the apparatus further comprises means for writing the blocks of error correction encoded information on a record carrier.

3. Apparatus comprising:

an input for receiving a data stream of information;

error correction encoding means for error correction encoding portions of the data stream of information so as to obtain blocks of error correction encoded information, a block of error correction encoded information containing a plurality of n ordered sync blocks, each sync block containing a sync word and a portion of the error correction encoded information, where n is a positive integer larger than 3, the error correction encoding means supplying said synch word to each sync block such that each of said synch words is one of m mutually different sync words, such that each sequence of two sync words of corresponding two sync blocks of the n synch blocks is unique with respect to the bit patterns therewithin, said corresponding two sync blocks being separated from each other by one other sync block and by no more than one other sync_block, m being an integer for which 2<m<n;

an output for supplying the blocks of error correction encoded information.

4. Apparatus comprising:

an input for receiving a data stream of information;

error correction encoding means for error correction encoding portions of the data stream of information so as to obtain blocks of error correction encoded information, a block of error correction encoded information containing a plurality of n ordered sync blocks, each sync block containing a sync word and a portion of the error correction encoded information, where n is a positive integer larger than 4, the error correction encoding means supplying said synch word to each synch block such that each of said synch words is one of m mutually different sync words, such that each sequence of two sync words of corresponding two sync blocks of the n synch blocks is unique with respect to the bit patterns therewithin, said corresponding two sync blocks being separated from each other by two other sync blocks and by no more than two other sync blocks, m being an integer for which 3<m<n; and an output for supplying the blocks of error correction encoded information.

5. Apparatus comprising:

an input for receiving blocks of error correction encoded information;

error correction means for error correcting the blocks of error correction encoded information, a block of error correction encoded information containing n ordered sync blocks, each sync block containing a sync word and a portion of said error correction encoded information, where n is a positive integer larger than 3;

the error correction means including detection means for detecting the ith and jth sync block of the n ordered sync blocks, so as to identify the position of the ith and jth sync block in the n ordered sync blocks, wherein i and j are integers such that i≠j and 1≦i≦n and 1≦j≦n; and an output for supplying the blocks of error corrected information as a serial data stream of information.

6. Apparatus comprising;

an input for receiving blocks of error correction encoded information;

error correction means for error correcting the blocks of error correction encoded information, a block of error correction encoded information containing n ordered sync blocks, each sync block containing a sync word and a portion of the error correction encoded information, where n is a positive integer larger than 3;

the error correction means including detection means for detecting p sync words of p corresponding sync blocks of the n ordered sync blocks, where p is an integer larger than 2, the detection means being adapted to identify the position of p−2 intermediate sync blocks of the p sync blocks using the detected sync words of the first and last sync blocks of the p sync blocks; and an output for supplying the blocks of error corrected information as a serial data stream of information.

7. Apparatus comprising:

an input for receiving blocks of error correction encoded information;

error correction means for error correcting the blocks of error correction encoded information, a block of error correction encoded information containing a plurality of n ordered sync blocks, each sync block containing a sync word and a portion of the error correction encoded information, where n is a positive integer larger than 3;

the error correction means including detection means for detecting two sync words of two corresponding sync blocks of the n ordered sync blocks and for determining the distance between the two sync words, said distance being the number of other sync blocks existing between the two sync blocks, the two sync words being the sync words of the ith an jth sync block of the n ordered sync blocks, so as to identify the position of the ith and jth sync block in the n ordered sync blocks, wherein i and j are integers such that i≠j and 1≦i≦n and 1≦j≦n; and an output for supplying the blocks of error corrected information as a serial data stream of information.

8. The apparatus of claim 7, in which the detection means include a conversion table for identifying the position of the ith and jth sync block.

9. A method comprising the steps of:

receiving a data stream of information;

error correction encoding portions of the data stream of information so as to obtain blocks of error correction encoded information, a block of error correction encoded information containing n ordered sync blocks, each sync block containing a sync word and a portion of the error correction encoded information, where n is a positive integer larger than 3, the error correction encoding includes supplying said synch word to each synch block such that each of said synch words is one of m mutually different sync words, such that each sequence of corresponding two sync blocks of the n synch blocks is unique with respect to the bit patterns therewithin, said corresponding two sync blocks being consecutive sync blocks, m being an integer for which 2<m<n; and supplying the blocks of error correction encoded information.

10. The method of claim 9 further comprising the step of writing the blocks of error correction information onto a record carrier.

11. The method of claim 9, in which the error correction encoding includes supplying a specific one of the m sync words only to the first sync block of the n sync blocks in each of the blocks of error correction encoded information;

the error correction encoding includes channel encoding either the data stream of information or the blocks of error correction encoded data stream of information; and the method further comprises the step of writing the blocks of error correction encoded information on a record carrier.

12. A method comprising the steps of:

receiving a data stream of information;

error correction encoding portions of the data stream of information so as to obtain blocks of error correction encoded information, a block of error correction encoded information containing n ordered sync blocks, each sync block containing a sync word and a portion of the error correction encoded information, where n is a positive integer larger than 3, the error correction encoding includes supplying said synch word to each synch block such that each of said synch words is one of m mutually different sync words, such that each sequence of two sync words of corresponding two sync blocks of the n synch blocks is unique with respect to the bit patterns therewithin, said corresponding two sync blocks being separated from each other by one other sync block and by no more than one other sync block, m being an integer for which 3<m<n; and supplying the blocks of error correction encoded information.

13. The method of claim 12 further comprising the step of writing the blocks of error correction information onto a record carrier.

14. A method comprising the steps of:

receiving a data stream of information;

error correction encoding portions of the data stream of information so as to obtain blocks of error correction encoded information, a block of error correction encoded information containing n ordered sync blocks, each sync block containing a sync word and a portion of the error correction encoded information, where n is a positive integer larger than 4, the error correction encoding includes supply one of m mutually different sync words to each of the n sync blocks, such that each sequence of two sync words of corresponding two sync blocks of the n synch blocks is unique with respect to the bit patterns therewithin, said corresponding two sync blocks being separated from each other by two other sync blocks and by no more than two other sync blocks, m being an integer for which 3<m<n; and supplying the blocks of error correction encoded information.

15. The method of claim 14 further comprising the step of writing the blocks of error correction information onto a record carrier.

16. A record carrier, comprising:

a block of error correction encoded information containing n ordered sync blocks, each sync block containing a sync word and a portion of the error correction encoded information, where n is a positive integer larger than 3, each of said synch words is one of m mutually different sync words, such that each sequence of corresponding two sync blocks of the n synch blocks is unique with respect to the bit patterns therewithin, said corresponding two sync blocks being consecutive sync blocks, m being an integer for which 2<m c<n.

17. A record carrier comprising:

a block of error correction encoded information containing n ordered sync blocks, each sync block containing a sync word and a portion of the error correction encoded information, where n is a positive integer larger than 3, each of said synch words is one of m mutually different sync words, such that each sequence of two sync words of corresponding two sync blocks of the n synch blocks is unique with respect to the bit patterns therewithin, said corresponding two sync blocks being separated from each other by one other sync block, m being an integer for which 3<m<n.

18. A record carrier comprising:

a block of error correction encoded information containing n ordered sync blocks, each sync block containing a sync word and a portion of the error correction encoded information, where n is a positive integer larger than 4, each of said synch words is one of m mutually different sync words, such that each sequence of two sync words of corresponding two sync blocks of the n synch blocks is unique with respect to the bit patterns therewithin, said corresponding two sync blocks being separated from each other by two other sync blocks, m being an integer for which 3<m<n.

19. Apparatus comprising:

an input for receiving a data stream of information; and error correction encoding means for error correction encoding portions of the data stream of information so as to obtain blocks of error correction encoded information, a block of error correction encoded information containing a plurality of n ordered sync blocks, each sync block containing a sync word and a portion of the error correction encoded information, where n is a positive integer larger than k, said k being a positive integer of at least 3, the error correction encoding means supplying said synch word to each synch block such that each of said synch words is one of m mutually different sync words, such that each sequence of two sync words of corresponding two sync blocks of the n synch blocks is unique with respect to the bit patterns therewithin, said corresponding two sync blocks being separated from each other by k−2 other sync blocks and by no more than k−2 other sync blocks, m being an integer for which k−1<m<n.

20. The apparatus of claim 19, wherein k=3.
21. The apparatus of claim 19, wherein k=4.
22. The apparatus of claim 19, wherein k=5.

23. A method comprising the steps of:

receiving a data stream of information; and encoding portions of the data stream of information so as to obtain blocks of error correction encoded information, a block of error correction encoded information containing a plurality of n ordered sync blocks, each sync block containing a sync word and a portion of the error correction encoded information, where n is a positive integer larger than k, said k being a positive integer of at least 3, the error correction encoding means supplying said synch word to each synch block such that each of said synch words is one of m mutually different sync words, such that each sequence of two sync words of corresponding two sync blocks of the n synch blocks is unique with respect to the bit patterns therewithin, said corresponding two sync blocks being separated from each other by k−2 other sync blocks and by no more than k−2 other sync blocks, m being an integer for which k−1<m<n.

24. The method of claim 23, wherein k=3.

25. The method of claim 23, wherein k=4.

26. The method of claim 23, wherein k=5.

\* \* \* \* \*